March 28, 1944.　　　F. C. BEST　　　2,345,448
MOTOR VEHICLE
Filed May 7, 1938　　　2 Sheets-Sheet 1
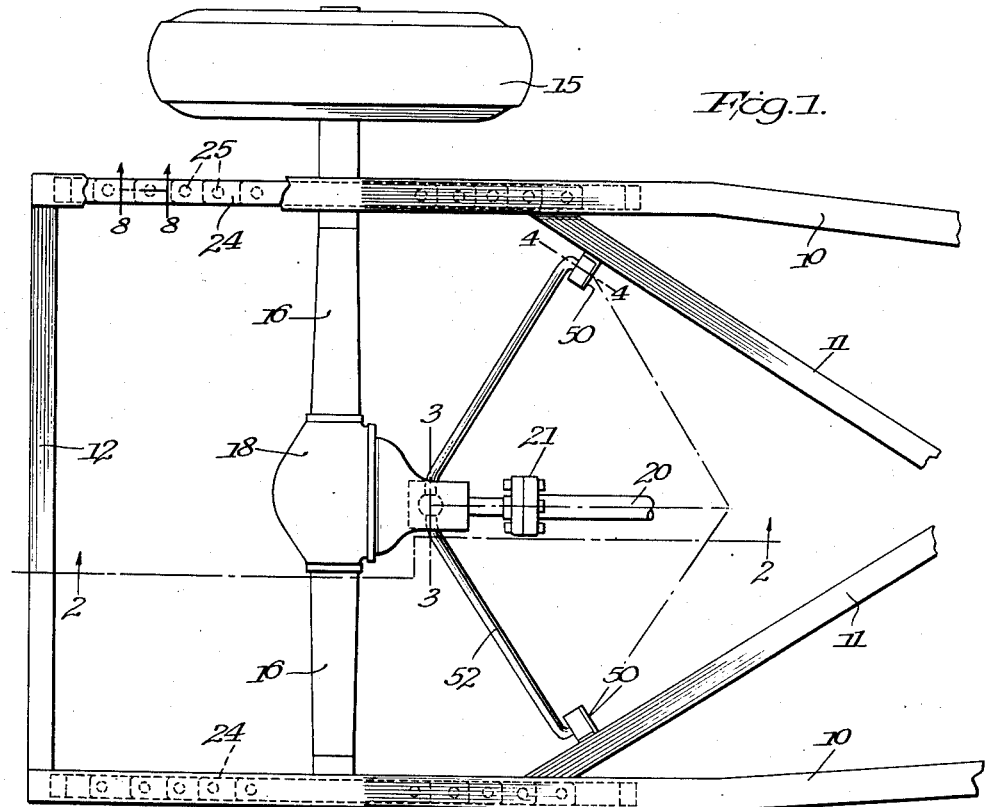
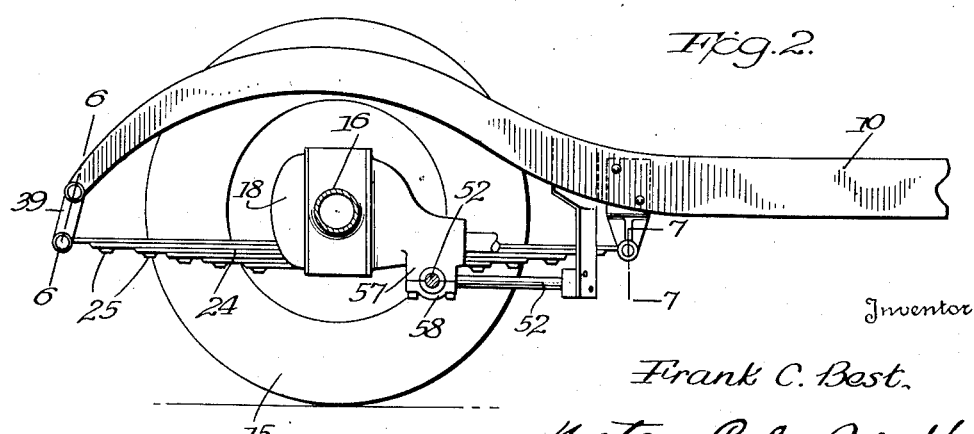
Inventor
Frank C. Best
By Watson, Cole, Grindle & Watson
Attorneys March 28, 1944.   F. C. BEST   2,345,448
MOTOR VEHICLE
Filed May 7, 1938   2 Sheets-Sheet 2
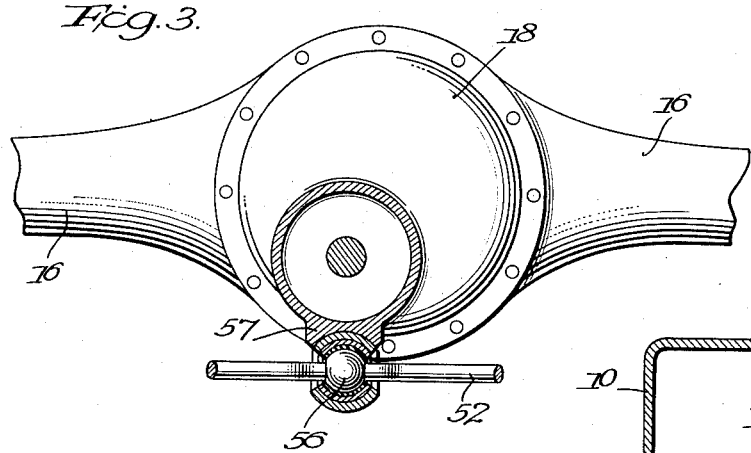
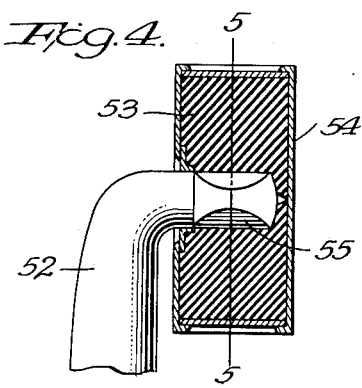
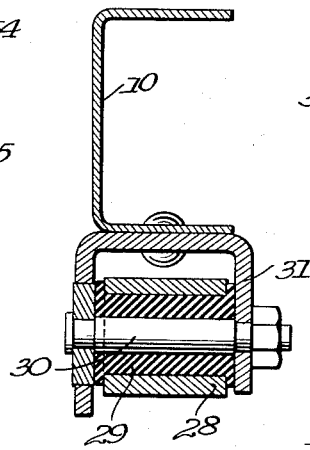
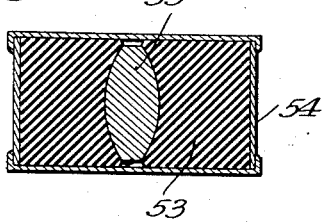
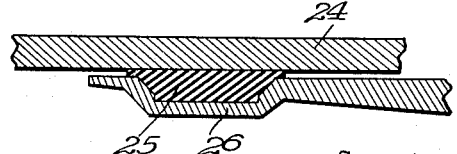
Inventor
Frank C. Best
By Watson, Cole, Grindle & Watson
Attorneys Patented Mar. 28, 1944

2,345,448

UNITED STATES PATENT OFFICE 2,345,448

MOTOR VEHICLE

Frank C. Best, Detroit, Mich., assignor to Packard Motor Car Company, Detroit, Mich., a corporation of Michigan Application May 7, 1938, Serial No. 206,679

10 Claims. (Cl. 180—73)

This invention relates to motor vehicles and is more particularly concerned with improvements in and relating to vehicle wheel suspensions. It is the principal object of the invention to promote riding comfort by minimizing undesirable movements of the vehicle body and by reducing vibration originating in the vehicle propulsion and suspension systems.

It is found that when a vehicle passes over an irregular road bed, so that one road wheel rises or falls abruptly with respect to the wheel on the opposite side, the vehicle body is thrust laterally. For example, when one wheel meets an obstacle and rises, the axle swings upwardly about the point of contact of the opposite wheel with the road bed. The longitudinal vertical planes passing through the points of connection of the oppositely disposed springs to the axle are thus brought closer together, and one or both of the springs must flex laterally. That spring which is the flatter of the two is more resistant to lateral flexure, and the body is displaced toward the opposite side, the opposite spring yielding laterally to permit such movement. The lateral impact thus applied to the body is usually severe owing to the edgewise stiffness of the conventional leaf spring assembly.

It has been proposed to employ rubber inserts between the spring leaves and to connect the springs to the body through rubber. This tends to reduce the shock of lateral displacement of the body incident to unequal flexure of the springs, the shock being somewhat cushioned, but increases the tendency of this lateral displacement to persist, the body tending to move to and fro at a frequency which is determined by the mass of the body and the lateral flexibility of the springs, the damping action normally resulting from interleaf friction having been largely removed by the use of the rubber inserts between the leaves.

It has also been heretofore proposed, in vehicles which employ rubber or other friction reducing inserts between the leaves of the vehicle supporting springs, to anchor the body to the frame for the purpose of preventing the lateral body movement or float of the axle, but the means employed has usually consisted of a link or tie rod extending generally parallel to the axle and pivoted at its ends to the axle and the frame. As either wheel rises, any point on the axle tends to swing upwardly through an arc of which the center is located at the point of contact of the other wheel with the ground. Consequently, the arc described by that end of the link or tie rod which is intended for connection to the axle does not coincide with the arc described by that point on the axle selected for such connection. There is accordingly some relative lateral displacement of the body and axle when such links are employed, which lateral displacement is undesirable.

It is therefore an object of the invention to provide a construction which is reasonably effective in eliminating lateral movement of the body on the axle under the conditions stated and which will at the same time guide the axle and body in the relative paths which they normally tend to follow. More specifically, it is an object of the invention to provide, in a wheel suspension offering low damping to lateral bodily oscillation, a connection between the body and the frame in which the connecting means, if free from the axle, would describe an arc coinciding substantially with the arc described by that portion of the axle to which the connection is made. It is a feature of the invention that the connecting means is pivoted to the frame and to the axle at relatively low points so as to reduce to a minimum the lateral displacement of the body on the axle resulting from the use of such connecting means.

Again, if the damping of the springs is decreased in a vehicle employing the well-known Hotchkiss type of drive, in which rotation of the rear axle housing about a transverse axis is resisted largely by the springs, axle rotation in response to braking or driving torque becomes more pronounced, with accompanying brake or clutch chatter. It is also found with springs of low damping characteristics that in driving over sand or snow, the wheels crawl upwardly on the soft surface, and as the vehicle weight breaks down this surface, the axle drops; this up and down motion rotates the axle, setting up vibrational disturbances in the clutch and brakes. Such chatter also results from the employment of low damped springs when the vehicle wheels bounce in passing over certain types of uneven road surface. The instant invention contemplates the connection of the axle to the frame in such manner as to resist rotation of the axle and undesired flexing of the springs under such circumstances and consequently to eliminate this type of vibration.

Further objects and features of the invention will be apparent from the following description taken in connection with the accompanying drawings, in which Figure 1 is a plan view of the rear end of a motor vehicle illustrating the application of the instant invention thereto;

Figure 2 is a side elevation of the structure shown in Figure 1;

Figure 3 is a sectional view taken substantially on the line 3—3 of Figure 1;

Figure 4 is a section on the line 4—4 of Figure 1;

Figure 5 is a section on the line 5—5 of Figure 4;

Figure 6 is a section on the line 6—6 of Figure 2;

Figure 7 is a section on the line 7—7 of Figure 2; and

Figure 8 is a section on the line 8—8 of Figure 1.

For convenience in describing the invention reference is made hereinafter to the form thereof illustrated in the drawings and specific language is employed. It will nevertheless be understood that no limitation of the scope of the invention is thereby intended, various alterations and modifications being contemplated such as would normally occur to one skilled in the art to which the invention relates.

Referring first to Figure 1 of the drawings, it will be observed that the motor vehicle body is represented by the supporting side sills 10, which sills are connected by an X-frame structure of which the members 11 are shown and by a cross frame member 12 at the extreme rear of the body. Road wheels 15 are supported on axle housings 16, which are in turn mounted on a centrally disposed differential housing 18, it being understood that the road wheels are driven from gearing within the housing 18 through the medium of live axles within the axle housings 16. The gearing in the housing 18 is in turn operated from a drive shaft 20, suitable universal joints, of which the rear joint is indicated at 21, being disposed at opposite ends of this drive shaft so that the axle housings are free to turn about a transverse axis.

The axle housing and differential gearing are supported on the vehicle by means of leaf springs 24. Intermediate the individual leaves of these springs rubber inserts 25 are provided. For example, as shown more particularly in Figure 8, the outer end of each leaf may be formed with a depressed portion or pocket 26 in which is received one of the inserts 25, the latter bearing on the next adjacent leaf and being of sufficient thickness to separate the spring leaves for a distance of several inches adjacent the end of the shorter leaf of each contiguous pair of leaves. The longest leaf of each spring assembly is deformed at its forward end to provide an eye 28 which embraces a rubber bushing 29, as shown more particularly in Figure 7 of the drawings. The bushing 29 in turn is received on a spindle 30 which is supported in a U-shaped bracket 31, the latter being rigidly secured to the adjacent side sill 10. At its rear end each spring assembly 24 is deformed to provide an eye portion 35 embracing a bushing 36 of rubber or the like, the latter surrounding a spindle 38 which is pivotally mounted in the opposite sides 39 of a spring shackle. A second spindle 41 is likewise pivotally supported in the shackle sides 39 and a bushing 43 of rubber or the like surrounds the spindle 41. Surrounding the bushing 43 is a collar 44 which is in turn mounted in a U-shaped yoke 45, the latter being rigidly secured to the associated side sill 10 at the rear thereof.

By reason of the employment of the Hotchkiss type of drive, in which the torque tube for the drive shaft is eliminated and the drive shaft is connected through universal joints to the differential gearing at its rear end and to the selective change speed gearing at its forward end, and by reason of the employment of rubber inserts between the spring leaves and of rubber in the connections between the spring assemblies and the frame, the differential and axle housings are left fairly free to rotate about a transverse axis and no considerable resistance to bodily movement of the vehicle body on the axle is offered. Consequently the construction is subject to chatter and the body tends to vibrate or float laterally, as hereinbefore pointed out, with resultant discomfort to the passengers.

The details of the structure thus far described form no essential part of the instant invention, being merely illustrative of vehicle suspension systems of low damping, in which type of suspension system my invention is particularly useful. I therefore contemplate the practice of my invention in connection with various other types of suspension system in which the suspension springs or other elements of the system are so constructed or arranged as to permit or induce body movement or vibrational disturbances which can be overcome by the application of the principles of the invention. One method of applying these principles will now be explained with reference to the accompanying drawings.

Secured to each of the members 11 of the X-frame structure is a depending bracket 50. Supported at its opposite ends in the brackets 50 is a bar 52 formed to provide two angularly disposed arms, the nature of the supporting connection being shown more particularly in Figures 4 and 5 of the drawings. Thus each of these connections may include a generally rectangular casing 54 which is preferably completely filled with a block or mass 53 of deformable material such as rubber. Each of the casings 54 is rigidly secured in any convenient manner to one of the brackets 50, for example by bolting or riveting, and the opposite ends of the two arms of the bar 52 are flattened as at 55 and are bent inwardly to extend within the casings 54 and to seat within the rubber 53 therein. The rubber connection just described affords adequate resistance to undesired movements of the body and axle, and serves not only as a bearing requiring no lubrication, but also acts to cushion shocks which might be transmitted between the axle and the body if a more rigid type of connection were used.

Intermediate its ends the bar 52 is provided with a bearing portion 56, preferably of partispherical shape, which bearing portion is received within a complementary bearing bracket of which one part is formed in a depending boss 57 formed on the forward end and lower side of the differential housing and of which the other part is formed in a cap 58 which is bolted or otherwise secured to the boss 57, the construction being such that the bar 52 may rotate freely with respect to the differential and axle housings.

It is found that as the road wheels rise and fall, the lower portion of the differential housing tends to move in an arc of generally circular shape, the location and radius of this arc being determined by the points of connection of the forward ends of the leaf springs 24, to the frame and by the points of flexure of these springs. This arc lies in a vertical longitudinal plane disposed mid-way between the road wheels. Consequently, it is possible to consider this arc as defining the common base of two cones of which the apexes are located adjacent the side sills 10. In accordance with the present invention, the points of connection of the arms of the bar 52 to the frame are disposed at the apexes of these cones. Thus the bearing portion 56 of the bar 52 would, if free, describe an arc coinciding substantially with the arc which would be described by the complementary bearing formed in the boss 57 of the differential housing, and the normal movement of the differential housing will therefore not be impeded by reason of connection thereof to the frame through the bar 52. It will be apparent, however, that any substantial lateral movement of the body on the axle will be resisted by the bar 52. Similarly any tendency of the axle and differential housings to rotate about a transverse axis will be resisted by this bar and the soft ride which is inherent in a suspension characterized by low damping is realized without the disadvantages of axle vibration and body float hereinbefore described.

While the invention has been described with reference to the suspension for the rear end of the vehicle, in which relationship it is most useful, it will be apparent that certain features and advantages of the invention can be attained by applying the same to the suspension at the forward end of the vehicle.

Having thus described the invention, what is claimed as new and desired to be secured by Letters Patent is:

1. In a motor vehicle, the combination with a vehicle frame, road wheels disposed at opposite sides of said frame, axle means carrying said road wheels, resilient means supporting said axle means and road wheels on said frame for rising and falling movement and for limited lateral movement with respect thereto, said means yieldably constraining said axle to rising and falling movement in a path such that a point on said axle describes a generally circular arc in a vertical longitudinal plane, said means comprising longitudinal leaf spring means having one end thereof connected to said frame against longitudinal displacement, and means acting between said axle means and said frame for resisting relative lateral movement thereof, said last named means including a member having articulated connection with said axle means at said point and with said frame at a point located substantially at the apex of a cone of which the said arc defines the base.

2. In a motor vehicle, the combination with a vehicle frame, road wheels disposed at opposite sides of said frame, axle means carrying said road wheels, resilient means supporting said axle means and road wheels on said frame for rising and falling movement and for limited lateral movement with respect thereto, said means yieldably constraining said axle to rising and falling movement in a path such that a point on said axle describes a generally circular arc in a vertical longitudinal plane, said means comprising longitudinal leaf spring means having one end thereof connected to said frame against longitudinal displacement, and means acting betwen said axle means and said frame for resisting relative lateral movement thereof, said last named means including a member having articulated connection with said axle means at said point and with said frame at points on opposite sides of the vehicle, which last named points are located substantially at the apexes of cones of which the said arc defines the common base.

3. In a motor vehicle, the combination with a vehicle frame, of road wheels associated with said frame, axle means carrying said road wheels, means yieldingly supporting said road wheels and axle means on said frame for rising and falling movement with respect thereto, and rigid means pivotally connected to said frame and having a transverse pivotal connection with said axle means adjacent the mid-point of the length of the latter for resisting lateral movement of said frame on said axle means, said last named means including a member having arms directed laterally and extending forwardly from said axle means.

4. In a motor vehicle, the combination with a vehicle frame, of road wheels associated with said frame, axle means carrying said road wheels, means yieldingly supporting said road wheels and axle means on said frame for rising and falling movement with respect thereto, and rigid means having articulated connection with said axle means and pivotally connected to said frame for resisting rotation of said axle means about a transverse axis, said last named means including a member transversely pivoted to said axle means beneath the axis of the latter and extending forwardly and laterally for pivotal connection to said frame.

5. In a motor vehicle, the combination with a vehicle frame, of road wheels associated with said frame, axle means carrying said road wheels, means yieldingly supporting said road wheels and axle means on said frame for rising and falling movement with respect thereto, and means having articulated connection with said frame and with said axle means for resisting rotation of said axle means about a transverse axis, said last named means including a member extending longitudinally and laterally from said axle means, the point of articulated connection between said member and said axle means being below the transverse axis of said axle means and affording relative movement therebetween about a transverse axis.

6. In a motor vehicle, the combination with a vehicle frame, of road wheels associated with said frame, axle means carrying said road wheels, means yieldingly supporting said road wheels and axle means on said frame for rising and falling movement with respect thereto, and means having articulated connection with said frame and with said axle means for controlling the relative movements of the latter, said last named means comprising a rigid member, generally V-shaped in plan, having the apex thereof transversely pivoted to said axle means adjacent the mid-point of the length of the latter and the extremities thereof pivoted to the frame at opposite sides of the latter.

7. In a motor vehicle, the combination with a vehicle frame, of road wheels associated with said frame, axle means carrying said road wheels, means yieldingly supporting said road wheels and axle means on said frame for rising and falling movement with respect thereto, means having articulated connection with said frame and with said axle means for controlling the relative movements of the latter, said last named means comprising a rigid member, generally V-shaped in plan, having the apex thereof transversely pivoted to said axle means adjacent the mid-point of the length of the latter and the extremities thereof pivoted to the frame at opposite sides of the latter and forwardly of said axle means, and rubber interposed in said last named means between said axle means and said frame.

8. In a motor vehicle, the combination with a vehicle frame, of road wheels associated with said frame, axle means carrying said road wheels, means yieldingly supporting said road wheels and axle means on said frame for rising and falling movement with respect thereto, and means having articulated connection with said frame and with said axle means for controlling the relative movements of the latter, said last named means comprising a rigid member, generally V-shaped in plan, having the apex thereof pivoted to said axle means adjacent the mid-point of the length of the latter and below the transverse axis of the latter.

9. In a motor vehicle, the combination with a vehicle frame, rear driving road wheels associated with said frame, axle and differential housing means carrying said wheels, resilient means supporting said road wheels and housing means on said frame for rising and falling movement and for limited lateral movement with respect thereto, and a generally V-shaped bar having the apex thereof pivoted to the lower portion of said differential housing means and the arms thereof diverging forwardly and pivotally connected to opposite sides of said frame.

10. In a motor vehicle, the combination with a vehicle frame, rear driving road wheels associated with said frame, axle and differential housing means carrying said wheels, resilient means supporting said road wheels and housing means on said frame for rising and falling movement and for limited lateral movement with respect thereto, a generally V-shaped bar having the apex thereof pivoted to the lower portion of said differential housing means and the arms thereof diverging forwardly and pivotally connected to opposite sides of said frame, and means including rubber interposed between said bar and said frame.

FRANK C. BEST.